United States Patent [19]

Haller

[11] Patent Number: 5,713,586
[45] Date of Patent: Feb. 3, 1998

[54] OPTICALLY RESPONSIVE MOBILITY APPARATUS

[76] Inventor: William R. Haller, 425 Brighton St. #403, Bethlehem, Pa. 18015

[21] Appl. No.: 377,822

[22] Filed: Jan. 25, 1995

[51] Int. Cl.$^6$ .................................................. B60T 7/12
[52] U.S. Cl. .................. 280/87.051; 180/169; 188/5; 188/111
[58] Field of Search .................. 280/87.051, 87.021; 180/167, 169, 271, 272, 276; 188/5, 167, 110, 111

[56] References Cited

U.S. PATENT DOCUMENTS

| | | | |
|---|---|---|---|
| 1,102,932 | 7/1914 | Lautenbacher et al. | 188/5 |
| 2,113,056 | 4/1938 | McKinnon | 188/5 |
| 3,652,103 | 3/1972 | Higgs | 280/33.994 |
| 3,712,426 | 1/1973 | Gilbrech | 188/164 |
| 3,749,197 | 7/1973 | Deutsch | 180/169 |
| 4,068,734 | 1/1978 | Foeller | 180/169 |
| 4,199,043 | 4/1980 | Lankester et al. | 188/111 |
| 4,226,413 | 10/1980 | Daugherty | 272/70.4 |
| 4,579,359 | 4/1986 | Schwartz | 280/87.02 |
| 4,609,075 | 9/1986 | Snedeker | 188/5 |
| 4,844,209 | 7/1989 | Sedlack | 188/5 |
| 4,891,624 | 1/1990 | Ishikawa et al. | 180/169 |
| 4,893,691 | 1/1990 | Park | 180/169 |
| 4,918,607 | 4/1990 | Wible | 180/169 |
| 4,934,477 | 6/1990 | Dai | 180/169 |
| 4,987,978 | 1/1991 | Jungersen | 188/2 F |
| 5,121,018 | 6/1992 | Oldakowski | 310/77 |
| 5,197,750 | 3/1993 | DiGeorge | 280/250.1 |
| 5,293,955 | 3/1994 | Lee | 180/169 |
| 5,366,231 | 11/1994 | Hung | 280/87.051 |
| 5,590,892 | 1/1997 | Hu | 280/87.051 |

FOREIGN PATENT DOCUMENTS

0194861  11/1982  Japan ......................... 180/167

*Primary Examiner*—Brian L. Johnson
*Assistant Examiner*—Min Yu

[57] ABSTRACT

A conventionally constructed baby walker 5 having a lower support member 6 to which are attached front wheels 10 and rear wheels 12 in contact with floor surface 14 has further optically activated brake assemblies 21a and 21b both moveably attached to support member 6, the bottom surface of each is rollably in contact with floor surface 14. Brake assemblies 21a and 21b each contain an infrared emitter and photodiode disposed above surface 14 and connected to a control circuit. An optically encoded arc shaped strip 15 having a pattern of alternating reflective and non reflective bands is further attached to floor surface 14 using conventional screws 19. Preferably strip 15 is placed in front of a descending staircase 20 or other level drop such as may be encountered with a patio or porch. As walker 5 is propelled across surface 14 and over strip 15, the optically encoded pattern is detected by the infrared emitter—photodiode combination of braking assembly 21a. In response to detecting this pattern, the control circuit releases a latching mechanism which engages braking assembly 21a. With brake assembly 21a engaged, the frictional contact between surface 14 and the bottom surface of brake assembly 21a is forceably increased. Additionally, engaged brake assembly 21a transmits a signal to brake assembly 21b which, in response to this signal, also engages thus further increasing the frictional contact between surface 14 and the bottom surface of brake assembly 21b. Both engaged brake assemblies now quickly arrest walker 5 and prevent any substantial movement past strip 15. Audible alarms contained within both brake assemblies 21a and 21b are additionally energized alerting attending personnel.

3 Claims, 8 Drawing Sheets

OPTICALLY RESPONSIVE MOBILITY APPARATUS

FIELD OF INVENTION

This invention relates generally to mobility apparatus traversing a surface, and more particularly, to upright walkers, baby walkers, wheeled toys and wheelchairs having an optically responsive braking assembly.

CROSS-REFERENCE TO RELATED APPLICATIONS

This application is related to application Ser. No. 08/312,883 filed Sep. 27, 1994 abandoned, which is hereby incorporated into this application.

BACKGROUND OF THE INVENTION

All mobility apparatus have the potential of being unintentionally propelled down an unprotected flight of steps usually resulting in serious injury to the user. This is especially true of curious infants placed within a conventionally constructed baby walker who are not capable of discerning the potential danger of an unprotected staircase. Additionally, many mobile toys have the same potential of being unintentionally propelled down an open staircase. Further, adults using wheelchairs or upright walkers face similar risks of receiving serious injury by unintentionally falling down either an unprotected staircase or between floor levels.

In my aforesaid prior, co-pending application there is described an improved mobility apparatus which comprises a magnetically activated brake assembly which is responsive to a magnetically permeable boundary strip secured to the floor surface and preferably located in front of an open staircase. A number of these brake assemblies can then attached around the periphery of the mobility apparatus providing an effective braking system irrespective of any relative rotational movement of the mobility apparatus with respect to the boundary. As the mobility apparatus rolls over the strip the first brake assembly to pass over the strip automatically engages. Depending upon the number of brake assemblies placed around the periphery of the mobility apparatus and the combined weight and speed of the mobility apparatus and the occupant, the forward momentum of the occupied mobility apparatus may cause the mobility apparatus to pass an unsafe distance beyond the boundary strip towards the open staircase potentially placing the occupant in a dangerous position before additional brake assemblies can be engaged to fully arrest the apparatus.

It is to an improved mobility apparatus which comprises a braking assembly which when first engaged, automatically engages all other braking assemblies irrespective of their position with respect to the boundary strip that the present invention is directed.

SUMMARY OF THE INVENTION

The invention provides an improved mobility apparatus, the improvement comprising an optically responsive release mechanism which engages a brake assembly and arrests the mobility apparatus. An optically encoded boundary strip is placed in front of the staircase or other level drop. As the mobility apparatus rolls over the boundary strip, the first brake assembly to contact the boundary strip engages and also automatically signals all other brake assemblies. In response to this signal, the other brake assemblies immediately engage thereby preventing any substantial mobility apparatus movement beyond the boundary strip.

Each brake assembly consists of an outer cylindrically shaped housing having an attached rectangular compartment. A substantially solid wall partitions the interior of the housing into an upper and lower chamber. The upper chamber contains an audible alarm. The lower chamber contains an extendable piston. A compressible spring is disposed between the upper end of the piston and the partition wall of the housing. The rectangular compartment contains a battery, control printed circuit board and solenoid.

The brake assembly is initially disengaged by forceably inserting the piston into the lower chamber against the force exerted by the compressed spring. A releaseable latching mechanism locks the piston in this position and prevents further vertical piston movement. The solenoid is further attached to the latching mechanism.

The bottom of the piston further contains an infrared emitter and infrared detector. The emitter and detector are positioned such that any incident emissions from the emitter will reflect off of a parallel aligned reflective surface placed beneath the emitter and detector pair which will then be subsequently received by the detector.

As the mobility apparatus rolls over the boundary strip, the bottom end of the first brake assembly to engage the strip slides up and over the top of the strip. The incident infrared radiation is reflected off of the optically encoded top of the strip and is subsequently received by the detector which signals the control circuit. In response to this signal the control circuit energizes both the audible alarm and solenoid. The energized solenoid releases the latching mechanism. The force of the compressed spring then forceably extends the piston outwardly from the bottom of the housing significantly increasing the amount of surface contact friction between the floor surface and mobility apparatus.

Additionally, immediately upon receiving the detector signal, the control circuit of the first brake generates a global brake engage signal which is then transmitted by the control circuit to all other brake assemblies. In response to this signal, all or the other corresponding solenoids are energized releasing all of the other latching mechanisms thereby allowing all of the other respective pistons to forceably move in a vertically downward direction.

All brake assemblies are now engaged having the bottom surface of all pistons now forceably coming into frictional contact with the top floor surface thus quickly arresting the mobility apparatus and preventing any further substantial movement beyond the reflective strip.

The brake assembly further comprises a retractable omni-directional rotating support which minimizes the frictional contact between the brake assembly and floor surface during normal mobility apparatus operation.

OBJECTS OF THE INVENTION

It is therefore an object of the invention to provide an improved mobility apparatus for automatically arresting in front of an open descending staircase.

It is another object of the invention to provide an improved mobility apparatus which automatically arrests as the mobility apparatus rolls over an optically encoded boundary.

It is yet a further object of the invention to provide a brake assembly responsive to an optically encoded boundary strip placed in front of an open staircase for preventing mobility devices from being propelled down an open staircase.

It is yet still a further object of the invention to provide an optically responsive brake assembly attached to a mobility apparatus which, at the moment of being engaged, automatically activates other similarly attached like brake assemblies for minimizing the amount of distance required to arrest a moving mobility apparatus.

It is yet still a further object of the invention to provide an optically activated brake assembly having an audible alarm for alerting adults of an imminent danger to a child's safety.

It is yet another further object of the invention to provide an inexpensive and easily manufactured brake assembly for preventing a mobility apparatus from being inadvertently propelled down an open staircase.

It is still yet another object of the invention to provide a mobility apparatus having a retractable omnidirectional rotating support for minimizing the frictional contact between the braking assembly and floor surface during normal mobility apparatus operation.

It is yet another object of the invention to provide a wheel assembly for controlling the rolling movement of a mobility apparatus.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
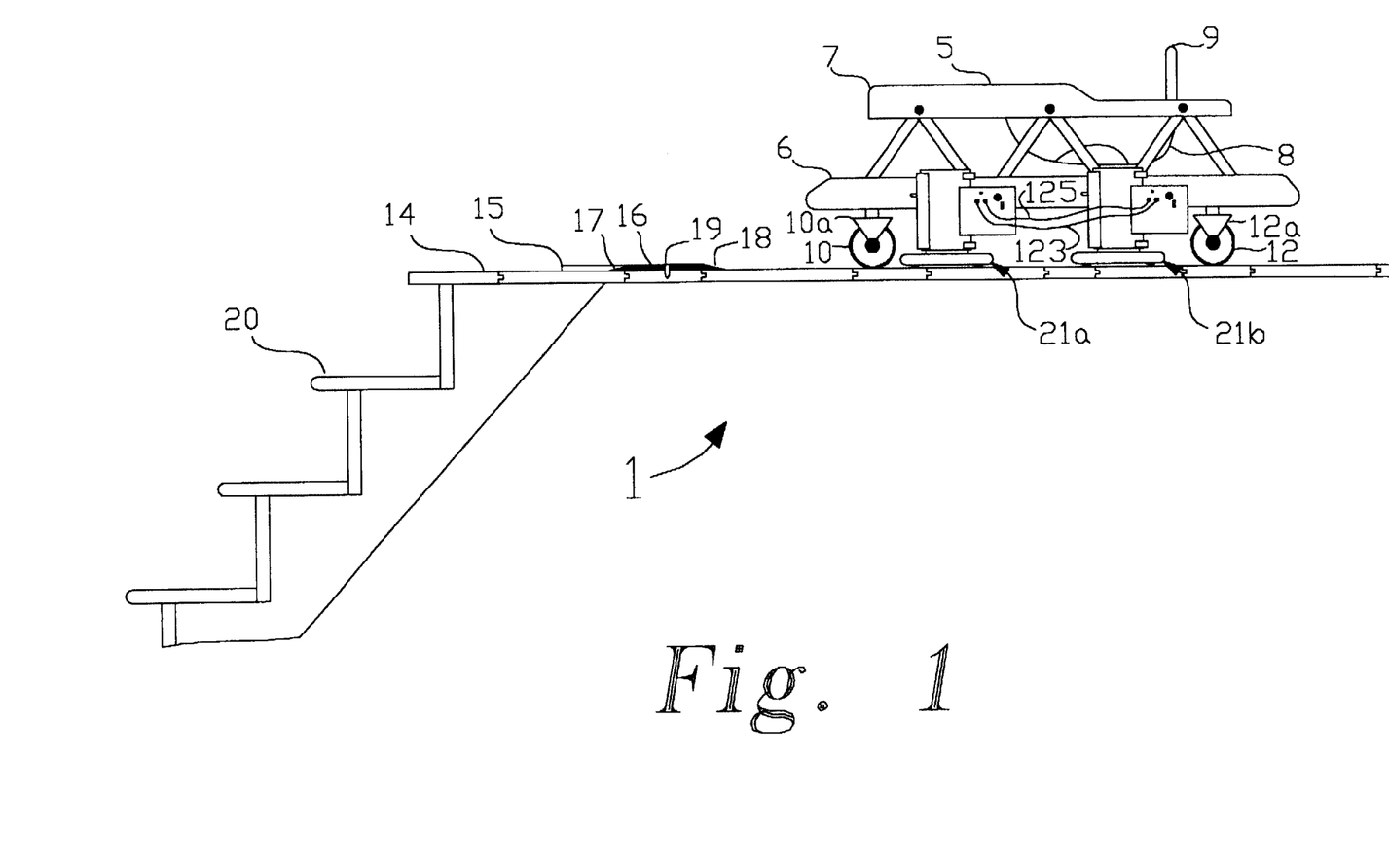
FIG. 1 illustrates a side view of the preferred embodiment of the present invention placed in front of both an optically encoded strip and an unprotected descending staircase.

Referring now to FIG. 1 of the drawings, there is shown a preferred embodiment 1 of the present invention comprising a conventionally constructed baby walker 5 having a lower support member 6. Upper support member 7 connects to and is vertically positioned over lower support member 6. Support member 7 further contains seat 8 and an integral backrest support 9 to support the occupant of walker 5. Additionally, brake assemblies 21a and 21b are moveably attached to support member 6 and in contact with tongue and groove floor surface 14. Brake assemblies 21a and are similarly constructed and are electrically interconnected via wires 123 and 125. Brake assemblies 21a and 21b are more fully described below.

Rotatably attached to support member 6 are front wheel support assemblies 10a and rear wheel support assemblies 12a. Front wheels 10 and rear wheels 12 are rollably attached to their respective wheel support assemblies 10a and 12a. Further, wheels 10, 12 are in contact with floor surface 14. Wheels 10, and 12, and respective rotatable wheel support assemblies 10a, and 12a, enable walker 5 to move unobstructively in all directions on floor surface 14 with a minimum amount of friction. Thus, a baby properly placed within walker 5 is able to easily propel themselves and traverse floor surface 14 in all directions.

An optically encoded reflective arc shaped strip 15 having respectively inside and outside beveled edges 17 and 18 is further attached to floor surface 14 using conventional screws 19. Strip 15 could also be attached to a smooth floor surface using conventional double sided tape or could be placed on top of a carpet covering floor surface 14. Preferably strip 15 is placed in front of a descending staircase 20 or other level drop such as may be encountered with a patio or porch.

Beveled edges 17 and 18 provide for a smooth transition from floor surface 14 to top surface 16 of strip 15 thereby allowing walker 5 and brake assembly 21a and 21b to smoothly ascend from the floor surface 14 to top 16 of strip 15 as walker 5 is propelled across strip 15 and also minimally hinders normal walking across strip 15.

Figure 2:
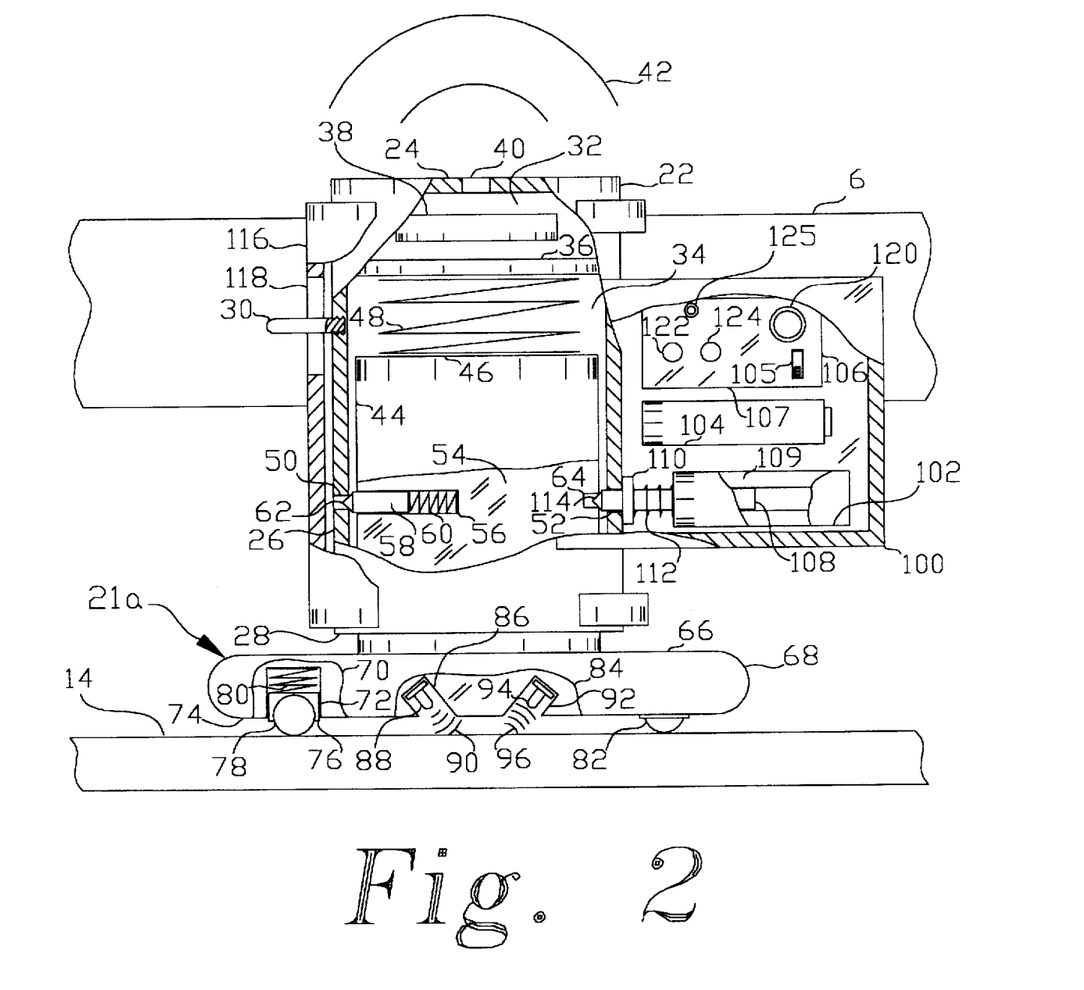
FIG. 2 illustrates a partly broken away side view of an optically responsive brake assembly of the preferred embodiment of the invention placed on a floor surface.

Referring now additionally to FIG. 2, brake assembly 21a comprises a substantially cylindrical shaped housing 22 having an enclosed top 24, outside wall 26 and open bottom 28. Further formed on the right side of outside wall 26 is rectangular shaped compartment 100. Affixed to the left side of wall 26 is one end of cylindrical shaped pin 30.

The hollow interior space of housing 22 is separated into upper chamber 32 and lower chamber 34 by solid disk shaped partition wall 36 parallelly aligned with top 24. Upper chamber encloses piezo electric alarm element 38. Further formed on top 24 is centered through hole 40 which passes sound waves 42 generated by energized alarm 38 into the surrounding space.

Lower chamber 34 encloses cylindrically shaped moveable piston 44 having a solid top surface 46. Disposed between the underside of wall 36 and the outside of top surface 46 is compressed spring 48. The outside diameter of piston 44 is slightly less in dimension than the inside diameter of wall 26 thus permitting piston 44 to unobstructively slide within lower chamber 34. Further formed on outside wall 26 of lower chamber 34 is through hole 50 and oppositely disposed through hole 52.

Referring now to interior portion 54 of piston 44, there is shown a cylindrically shaped blind hole 56 extending radially inwards from the outside wall of piston 44. Inserted into hole 56 is cylindrically shaped pin 58. The outside diameter of pin 58 is slightly less in dimension than the inside diameter of hole 56 thus allowing pin 58 to unobstructively move within hole 56. Positioned within hole 56 is compression spring 60 having one end abutted against the interior end surface of hole 56 and the other end engaging the interior end surface of pin 58. It is therefore understood that with pin 58 inserted into hole 56 spring 60 applies an outwardly directed force against pin 58. The exterior end surface of pin 58 has further formed triangularly shaped nib 62. With piston 44 forceably inserted and fully seated into mousing 22, nib 62 engages hole 50. Further shown within interior portion 54 is cylindrically shaped blind hole 64 oppositely disposed from, and axially aligned with, hole 56. The diameter of hole 64 equals the diameter of hole 50.

Formed on the lower portion of piston 44 is circumferential flange 66 having beveled edge 68. Within interior portion 70 of piston 44, there is shown a cylindrically shaped blind hole 72 extending vertically upwards from piston bottom surface 74 into the interior of flange 66. Inserted into hole 72 is cylindrically shaped cup 76 containing ball 78. Cup 76 supports and allows free rotation of ball 78. The diameter of cup 76 is slightly less than the diameter of hole 72 allowing cup 76 to move vertically within hole 72. Compression spring 80 is disposed between the top surface of cup 76 and the interior top surface of hole 72. The depth of hole 72 further permits the complete retraction of the entire cup 76 and ball 78 into the interior of hole 72. The bottom surface of ball 78 contacts top surface of floor 14. It is therefore understood that hole 72, cup 76, spring 80 and ball 78 comprise a springably affixed, retractable omnidirectional rotating support for brake assembly 21a. Ball 82 also provides a similarly constructed retractable support for brake assembly 21a.

Referring now to lower central interior portion 84 of piston 44, there is shown exteriorly opened, cylindrically shaped cavity 86 containing infrared light emitting diode 88. Diode 88 is positioned within cavity 86 to emit a focused narrow beam of infrared light 90 out of cavity 86. Oppositely disposed from cavity 86 is a similarly constructed cavity 92 containing a cooperating infrared photodetector 94. Photodetector 94 is positioned within cavity 92 to receive reflected infrared light 96 from the exterior underside of piston 44. Cavities 86 and 92 are aligned in such a manner so as to allow focused incident infrared light 90 emitted by diode 88 to reflect off of a reflective surface placed beneath and parallel to the bottom of underside surface 74 thereby producing reflected infrared light 96 which is then captured by photodetector 94.

Referring now to compartment 100, there is shown enclosed within compartment 100 conventional solenoid 102, battery 104 and control circuit 106. Control circuit 106 further comprises printed circuit control board 107 which secures and interconnects various electronic components (not shown), reset switch 120, output signal connector 122 and input signal connector 124, LED low battery indicator 125 and ON/OFF switch 105. Switches 105 and 120, connectors 122 and 124, and indicator 125 are all exteriorly accessible.

Solenoid 102 further comprises moveable cylindrically shaped plunger 108 partially enclosed by a cylindrically shaped coil 109. Formed on the end exterior portion of plunger 108 is flange 110. Axially positioned around the exterior of plunger 108 and between the body of solenoid 102 and flange 110 is compressed spring 112. The exterior end of plunger 108 has further formed a triangularly shaped nib 114 similar to nib 62. The diameter of plunger 108 further equals that of pin 58. With plunger 108 fully extended and with piston 44 inserted and fully seated within housing 22, the exterior end of plunger 108 passes through hole 52 with nib 114 engaging hole 64.

Thus it is understood that with piston 44 forceably and fully seated within housing 22, holes 50, 56, 64 and 52 are all axially aligned, nib 62 springably engages hole 50, and, with plunger 108 extended, nib 114 springably engages hole 64 thereby latching piston 44 within housing 22.

Housing 22 is further inserted into, and supported in a vertical direction by, cylindrically shaped bracket 116 which is affixed to lower support member 6 of mobility apparatus 5. Bracket 116 has further formed a vertically disposed through slot 118. Pin 30 extends from wall 26 through slot 118. The inside diameter dimension of bracket 116 is larger than the outside diameter dimension of housing 22. Thus housing 22 is free to vertically move within bracket 116 a distance determined by the length of slot 118. Thus brake assembly 21a is moveably attached to the mobility apparatus as previously described in my aforesaid co-pending application and can vertically move a predefined distance equal to the vertical length of slot 118.

Figure 3:
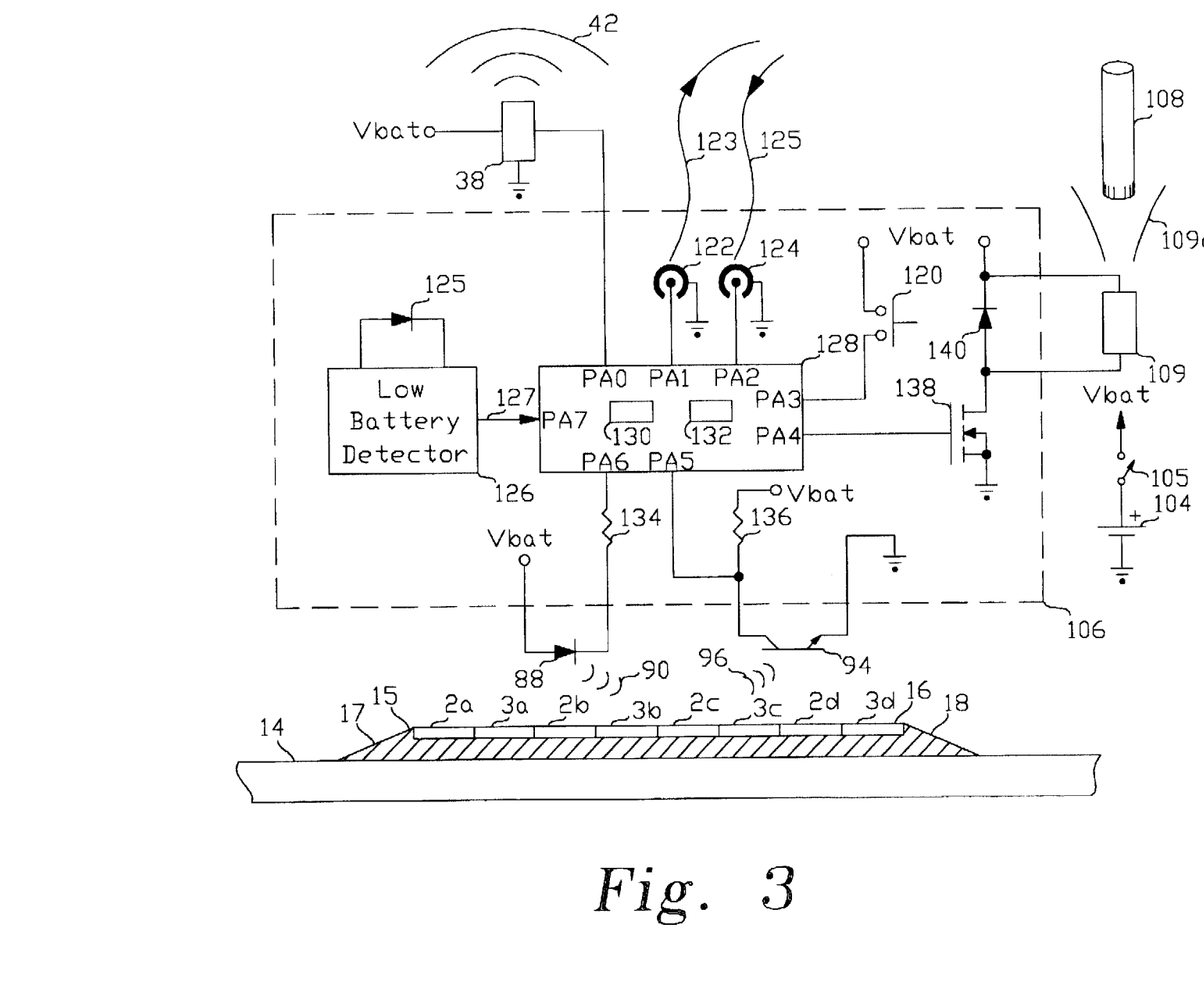
FIG. 3 illustrates a block diagram of the control circuit of the preferred embodiment of the invention.

Referring now additionally to FIG. 3, there is shown a schematic diagram of control circuit 106 positioned over reflective strip 15 and which substantially comprises low battery detector 126, microcontroller 128, output connector 122, input connector 124, reset SPST push button switch 120, diode 140, and power MOSFET transistor 138. Control circuit 106 is also generally shown connected to alarm element 38, solenoid coil 109, infrared emitting diode 88 and infrared photodetector 94. Battery 104 supplies voltage Vbat to control circuit 106 and alarm element 38 via ON/OFF switch 105.

Microcontroller 128 is a conventional 8 bit microcontroller integrated circuit such as a Motorola Semiconductor 68HC05K having random access memory (RAM) 130, read only memory (ROM) 132, and programmable input/output port pins PA0 through PA7. ROM 132 contains a program which controls the operation of microcontroller 128. RAM 130 is used for temporary storage of Program variables and input/output signals for port pins PA0–PA7. Additionally, RAM 130 includes two 8 bit registers Cntr1-and Cntr2 used as binary counters, two 8 bit registers Cntr-1 and Cntr-2 to respectively store the previous values of counters Cntr1 and Cntr2, and another 8 bit register having a single bit used as a test ("T") flag. Included but not shown is a crystal timing network which generates the clock signal for microcontroller 128.

Referring now to the specific connections to microcontroller 128, output pin PA0 connects to the control terminal of alarm element 38. Alarm element 38 further connects to battery voltage Vbat and ground. Alarm 38, in response to having the voltage at pin PA0 set equal to Vbat, produces audible alarm sounds Output pin PA1 connects to one terminal of output connector 122. The second terminal of connector 122 connects to ground. Input pin PA2 connects to one terminal of input connector 124. The second terminal of connector 124 connects to ground. Connectors 122 and 124 respectively send and receive signals from another similarly constructed brake assembly 21b. Output connector 122 of brake assembly 21a is connected via wire 123 to the corresponding input connector of brake assembly 21b and the corresponding output connector of brake assembly 21b is connected via wire 125 to input connector 124 of brake assembly 21a. This interlinking connection may be expanded to include any number of additional similarly constructed brake assemblies having the output of the first brake assembly connect to the input of the second brake assembly, the output of the second brake assembly connect to the input of the third brake assembly etc. This pattern is repeated until the output of the last brake assembly connects to the input of the first brake assembly.

Input pin PA3 connects to one terminal of SPST push button reset switch 120. The second terminal of switch 120 connects to battery voltage Vbat. Thus depressing switch 120 connects voltage Vbat to input Din PA3.

Output pin PA4 connects to the gate terminal of MOSFET switch transistor 138. The source terminal of transistor 138 connects to ground. The drain terminal of transistor 138 connects to both the anode of diode 140 and one end of coil 109. The other end of coil 109 and the cathode of diode 140 both connect to battery voltage Vbat. Placing a voltage onto pin PA4 causes transistor 138 to turn-on which allows current to flow from battery 104 through coil 109 to ground producing magnetic field 109a which in turn pulls plunger 108 into solenoid 102. Input pin PA5 connects to both one terminal of pull-up resistor 136 and the collector of phototransistor 94. The second terminal of resistor 136 connects to battery voltage Vbat. The emitter of phototransistor 94 connects to ground. With no infrared light impinging upon photodetector 94, photodetector 94 remains in the off condition preventing current flow through resistor 136 and thereby maintaining the signal on pin PA5 at voltage Vbat. With infrared light 96 impinging upon photodetector 94, photodetector 94 turns on and allows current flow from Vbat through resistor 136 thereby forcing the voltage on pin PA5 to ground. Thus a low or high signal on pin PA5 of controller 128 is respectively indicative of photodetector 94 receiving or not receiving infrared light 96.

Output pin PA6 connects to one terminal of current limiting resistor 134. The other end of resistor 134 connects to the cathode of infrared diode 88. The anode of diode 88 is connected to battery voltage Vbat. With pin PA6 held at voltage Vbat, no current flows through diode 88 and therefore no infrared light is emitted. However, with pin PA6 placed at ground, current flows from battery voltage Vbat through diode 88 and resistor 134 generating infrared light 90. Thus controller 128 controls the generation of pulses of infrared light 90 by pulsing the polarity of pin PA6 between Vbat and ground.

Input pin PA7 connects to conventional low battery voltage detector 126 via line 127. Low battery voltage detector 126 continually samples voltage Vbat and, in response to Vbat decreasing below a predetermined threshold, places a signal onto line 127 which flows to controller 128. Light emitting diode 125 connects to detector 126 and is illuminated when a low battery voltage condition exists.

Referring now specifically to reflective strip 15, it is shown that top surface 16 comprises parallelly aligned non reflective bands 2a, 2b, 2c and 2d, each of which is separated from one another by reflective bands 3a, 3b, 3c, and 3d. Thus the exteriorly exposed top surface of strip 15 comprises an alternating pattern of reflective and non reflective bands which extend the entire length of strip 15. Non reflective bands 2a–2d absorb and dissipate all emitted light 90, and therefore do not reflect any light 90 emitted by diode 88, while in comparison, reflective bands 3a–3b reflect any infrared light 90 emitted by diode 88. Further, the widths of non reflective bands 2a–2d equal the widths of reflective bands 3a–3d.

In operation and initially assuming that piston 44 has been first inserted and latched into housing 22 thereby disengaging brake assembly 21a, baby walker 5 freely traverses floor surface With piston 44 latched into housing 22, the retractable supports associated with balls 78 and 82 prevent surface 74 from frictionally contacting surface 14. Brake assembly 21a therefore freely traverses floor surface 14 having balls 78 and 82 rollably supporting brake assembly 21a. Additionally, brake assembly 21a also freely moves in a vertical direction a distance defined by the length of slot 118. Brake assembly 21b is also similarly disengaged. It is therefore understood that disengaged brake assemblies 21a and 21b minimally hinder the omnidirectional movement of mobility apparatus over floor surface 14. With brake assembly 21a disengaged, switch 105 is then placed in the ON position activating brake assembly 21a and supplying voltage Vbat to control circuit 106 and alarm element 38. A corresponding ON-OFF switch on brake assembly 21b is also placed in the ON position.

Figure 4:
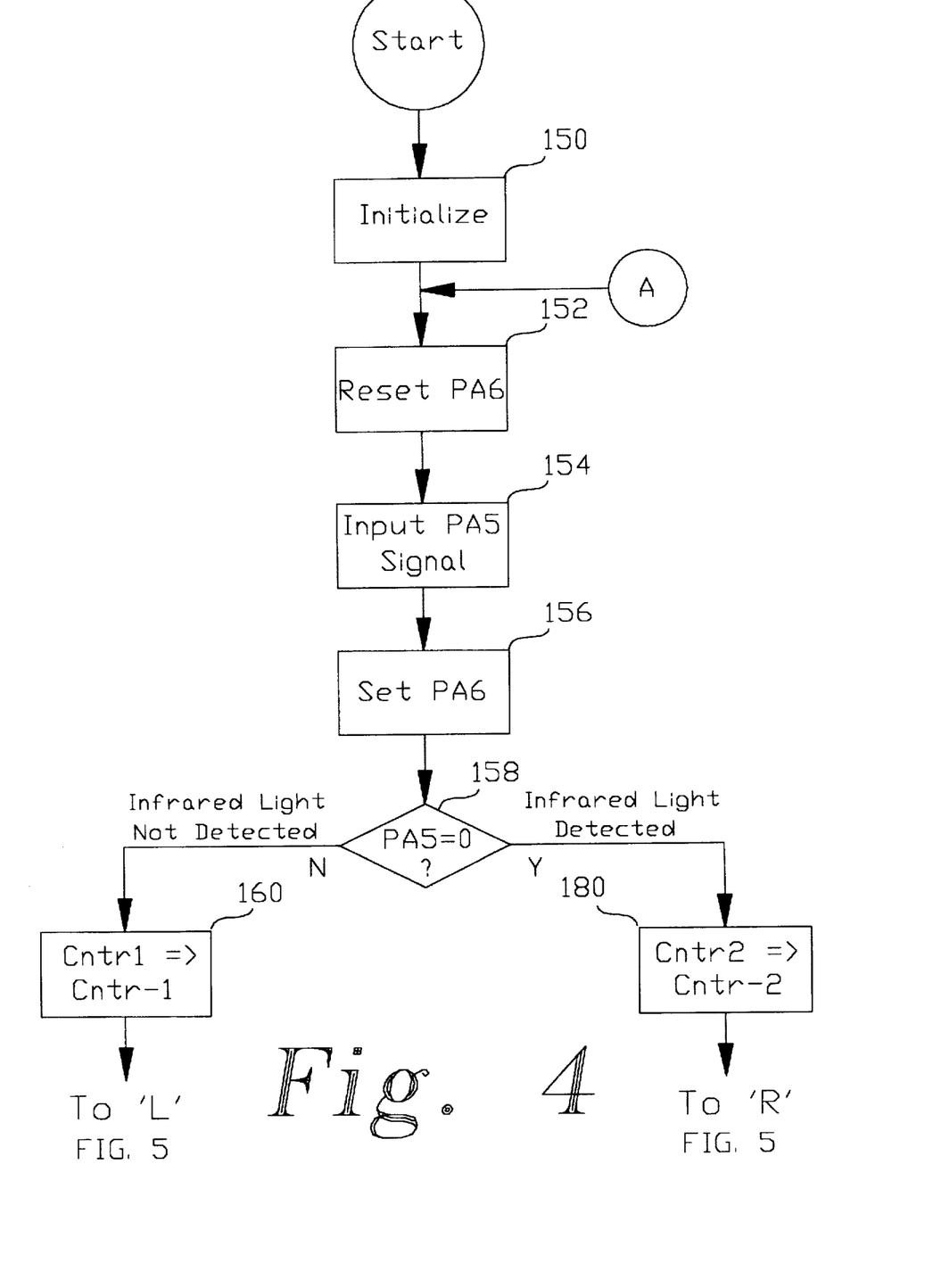
FIGS. 4–6, when read in combination, illustrates a flow chart of the program controlling the operation of the microcontroller of the preferred embodiment of the invention.
Figure 5:
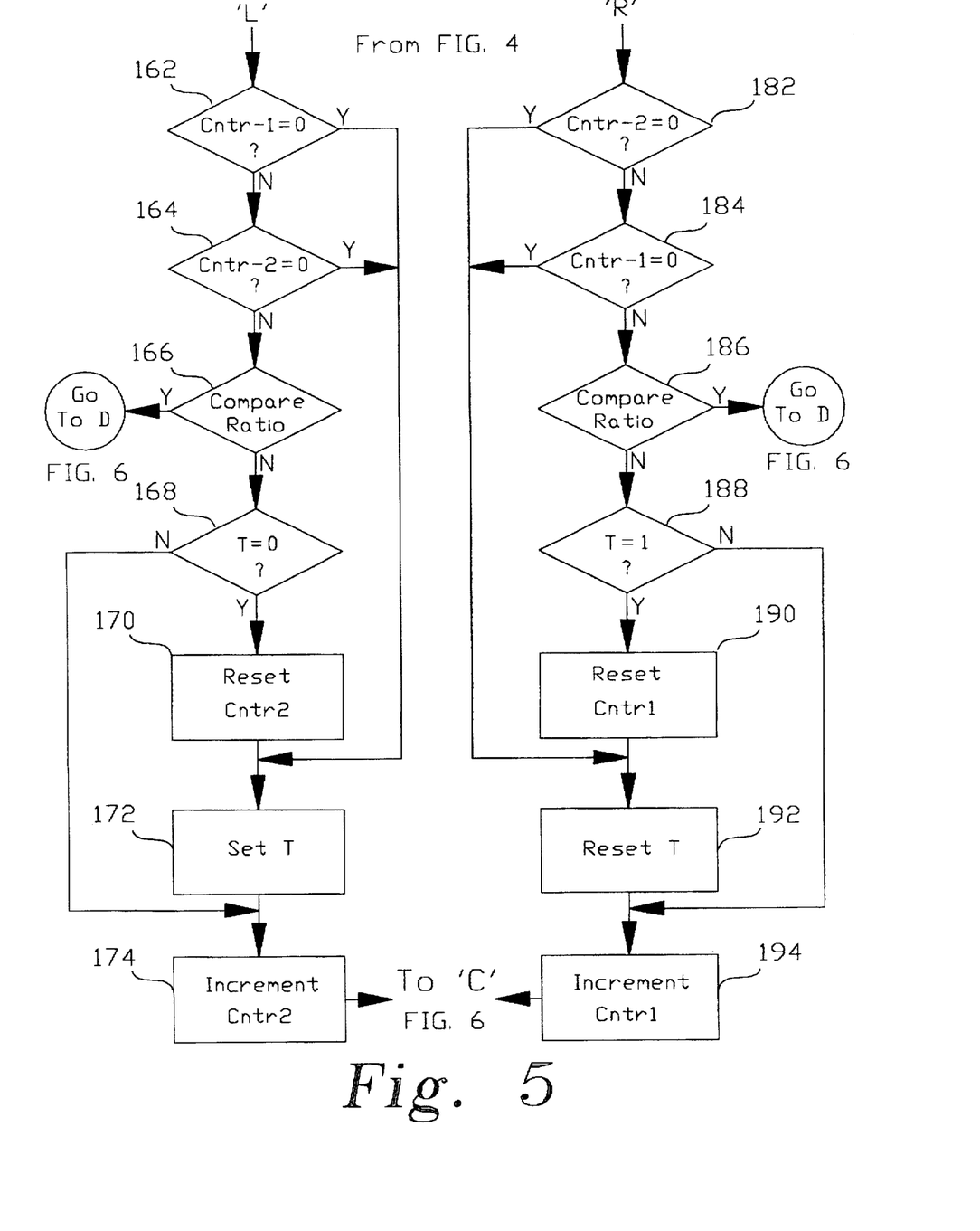
Figure 6:
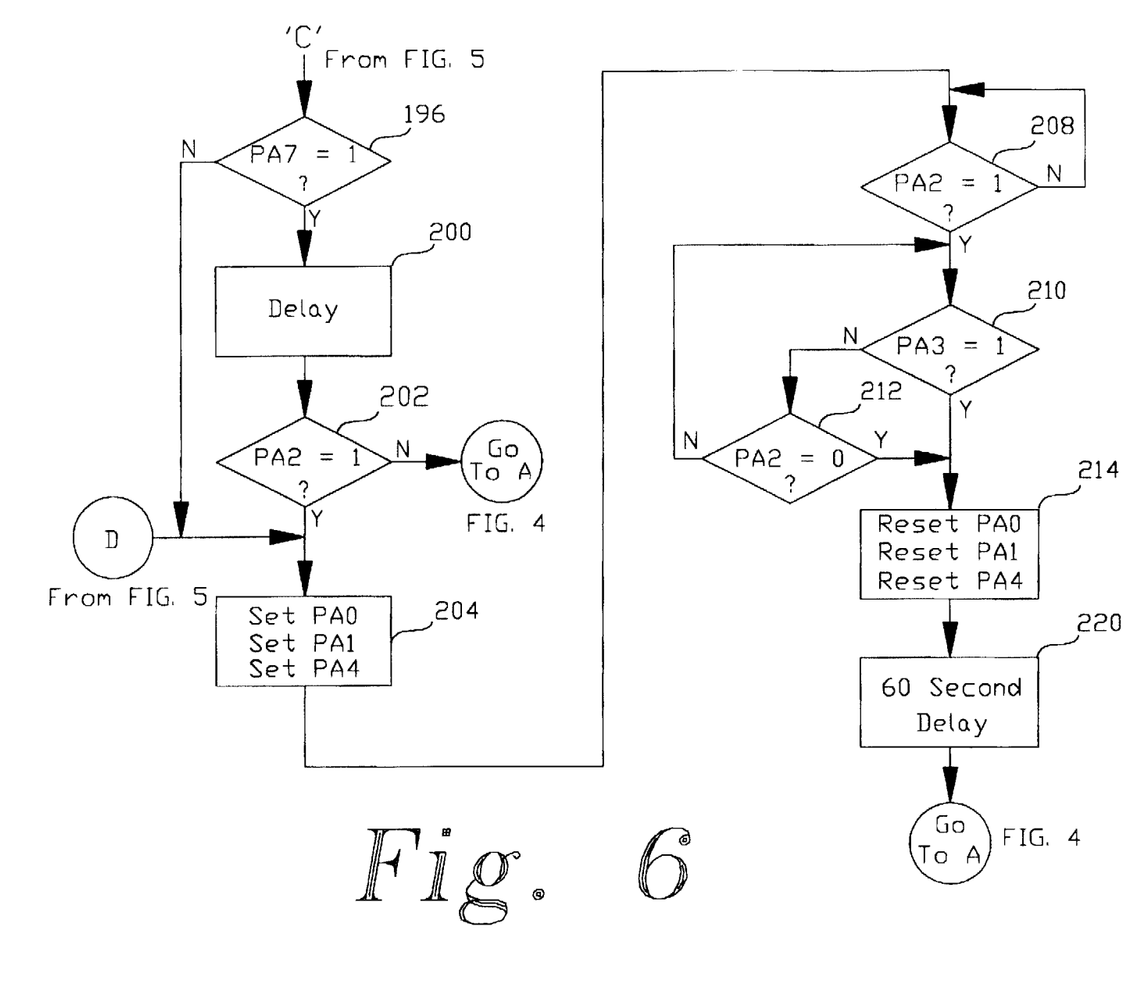

Referring now additionally to FIGS. 4–6, there is in combination shown a flow chart of the program steps controlling the operation of microcontroller 128. This program is stored in ROM 132. A similar program is stored within the corresponding ROM memory of brake assembly 21b. Within the following discussion, any program steps referring to brake assembly 21b are noted with a preceding asterisk. For example, step 202 is associated with brake assembly 21a and step 202 is associated with brake assembly 21b.

As voltage Vbat is first applied via switch 105, microcontroller 128 begins operation at step 150 in which microcontroller 128 initializes the various CPU registers and RAM 130 memory locations for continued operation. Additionally, counters Cntr1 and Cntr2 and registers Cntr-1 and Cntr-2 are reset. Further, microcontroller 128 programs the I/O port pins and establishes pins PA0, PA1, PA4 and PA6 as outputs and pins PA2, PA3, PA5 and PA7 as inputs. Microcontroller 128 then resets output pins PA0, PA1 and PA4 to ground and sets output pin PA6 to voltage Vbat. With pin PA0 at ground, alarm 38 is deactivated and does not produce alarm sounds 42. With pin PA1 at ground, a "brake assembly not engaged" signal is transmitted to brake assembly 21b. Further, with pin PA4 at ground transistor 138 is turned maintaining solenoid 109 in the non-energized state with nib 114 engaging hole 64. Also, with pin PA6 at voltage Vbat diode 88 is turned off. Microcontroller 128 then proceeds to step 152.

Within step 152, microcontroller 128 places pin PA6 to ground (resets pin PA6) enabling current flow through diode 88 and resistor 134. In response to this current flow, diode 88 turns on and emits focused infrared light 90 from cavity 86. Microcontroller 128 then proceeds to step 154.

Within step 154, microcontroller 128 inputs the voltage which is placed onto pin PA5 and stores the logical equivalent signal into RAM 130. If incident infrared light 90 is reflected off of a parallel aligned reflective surface placed beneath diode 88 and photodetector 94 producing reflective infrared light 96, photodetector 94 turns on and conducts current which then flows through resistor 136 thereby placing the voltage on pin PA5 near ground. If a non parallel aligned reflective surface, or a parallel aligned non reflective surface is present beneath diode 88 and photodetector 94, photodetector 94 is off and no current flows thereby placing the voltage on pin PA5 at Vbat. Thus the signal placed on pin PA5 equals a logic 0 if infrared light is reflected and subsequently received by photodetector 94 or equals a logic 1 if infrared light is not received by photodetector 94. Microcontroller 128 then proceeds to step 156.

Within step 156, microcontroller 128 sets pin PA0 to voltage Vbat preventing current flow through diode 88 and resistor 134 thus turning off diode 88. Thus diode 88 is pulsed on for only a short time interval equal to the time necessary for microcontroller 128 to complete steps 152, 154 and 156 thus minimizing power consumption from battery 104. Microcontroller 128 then proceeds to step 158.

Within step 158, microcontroller 128 then evaluates the signal on pin PA5 previously determined in step 154 and, if the signal equals a logic 0 (infrared light detected), branches to step 180. If the signal on pin PA5 equals a logic 1 (infrared light not detected), microcontroller 128 branches to step 160. The following discussion now refers to steps 160 through 174.

Within step 160, microcontroller 128 copies the current value of counter Cntr1 into register Cntr-1. Microcontroller 128 then proceeds to step 162 in which microcontroller 128 compares the value of register Cntr-1 to 0. If the value of register Cntr-1 equals 0, microcontroller 128 branches to step 172. If the value of register Cntr-1 does not equal 0, microcontroller 128 proceeds to step 164. Within step 164, microcontrol let 128 compares the value of register Cntr-2 to 0. If the value of register Cntr-2 equals 0, microcontroller 128 branches to step 172. If the value of register Cntr-2 does not equal 0, microcontroller 158 proceeds to step 166. Thus, steps 165 and 164 respectively check for either Cntr-1 or Cntr-2 register values equalling 0 and branches accordingly to step 172.

Within step 166, microcontroller 128 calculates the ratio of the value of register Cntr-1 to the value of register Cntr-2. Microcontroller 128 then compares this calculated ratio to determine if it lies between two predetermined constants N1 and N2. If the calculated ratio is between N1 and N2, microcontroller 128 branches to step 204. If the calculated ratio is not between N1 and N2, microcontroller 128 continues to step 168. Note that division by zero (Cntr-2 equals 0) is prevented by step 164. N1 and N2 are respectively equal to 0.8 and 1.2.

Within step 168, microcontroller 128 compares the value of the T flag to 0. If the T flag equals 0, microcontroller 128 then proceeds to step 170. If the T flag does not equal 0, microcontroller 128 proceeds to step 174. Within step 170, microcontroller 128 resets Cntr2 and proceeds to step 172. Within step 172, microcontroller 128 then sets the T flag to 1 and proceeds to step 174. The logical value of the T flag is used to determine the occurrence of the first initial pass through the sequence of steps 152 through 158 and continuing through step 168 in which counter Cntr2 is reset.

Within step 174, microcontroller 128 increments the value of counter Cntr2. Operation of microcontroller 128 then proceeds to step 196.

Referring now back to step 180 (infrared light detected), microcontroller 128 copies the current value of counter Cntr2 into register Cntr-2. Microcontroller 128 then proceeds to step 182.

Within step 182, microcontroller 128 compares the value of register Cntr-2 to 0. If the value of register Cntr-2 equals 0, microcontroller 128 branches to step 192. If the value of register Cntr-2 does not equal 0, microcontroller 128 proceeds to step 184. Within step 184, microcontroller 128 compares the value of register Cntr-1 to 0. If the value of register Cntr-1 equals 0, microcontroller 128 branches to step 192. If the value of register Cntr-1 does not equal 0, microcontroller 128 proceeds to step 186.

Within step 186, microcontroller 128 calculates the ratio of the value of register Cntr-1 to the value of register Cntr-2. Microcontroller 128 then compares this calculated ratio to determine if it lies between the two predetermined constants N1 and N2. If the calculated ratio is between N1 and N2, the microcontroller branches to step 204. If the calculated ratio is not between N1 and N2, microcontroller 128 continues to step 188.

Within step 188, microcontroller 128 compares the value of the T flag to 1. If the T flag equals 1, microcontroller 128 then proceeds to step 190. It the T flag does not equal 1, microcontroller 128 proceeds to step 194. Within step 190, microcontroller 128 resets counter Cntr1 and proceeds to step 192. Within step 192, microcontroller 128 then resets the T flag and proceeds to step 194. The logical value of the T flag is again used to determine the occurrence of a first initial pass through the sequence of steps 152 through 158 and continuing through step 188. Note that the T flag has been set in the previously executed step 172.

Within step 194, microcontroller 128 increments the value of counter Cntr1. Operation of microcontroller 128 then proceeds to step 196.

Within step 196, microcontroller 128 inputs the signal on pin PA7 and determines if the corresponding logic value equals 1(battery voltage is sufficient) or 0 (battery voltage is not sufficient). If the logic value of pin PA7 equals 1, microcontroller 128 proceeds to step 200. If the logic value of pin PA7 equals 0, microcontroller 128 branches to step 204.

Within step 200, microcontroller 128 delays continued operation for a 50 microsecond time interval. Operation of microcontroller 128 then proceeds to step 202.

Within step 202, microcontroller 128 inputs the signal on pin PA2 which originates from brake assembly 21b corresponding output connector. If the signal on pin PA2 equals a logic 1 indicating that brake assembly 21b has been previously engaged, microcontroller 128 then proceeds to step 204. If the signal on pin PA2 equals a logic 0 indicating that brake assembly 21b is still disengaged, microcontroller 128 branches back to step 152 to begin another cycle.

Thus generally, as walker 5 continually traverses a reflective floor surface such as a highly polished hardwood or linoleum floor surface, microcontroller 128 follows steps 152 through 158, branches to step 180 and continues through step 202 and then branches back to step 152 continually cycling through this sequence of steps (reflective cycle) until a non reflective surface is detected in step 158. For the initial first cycle beginning with step 152 through step 158 and continuing through step 190, the value of counter Cntr1 is reset. Counter Cntr1 is then incremented and, for each contiguous succeeding cycle, the value of counter Cntr1 is further incremented. Thus the value of counter Cntr1 indicates the number of infrared pulses received by photodetector 94 for a given reflective, properly aligned surface.

Similarly, if walker 5 continually traverses a non reflective floor surface such as a rug covered surface, microcontroller 128 again follows steps 152 through 158 but now branches to step 160 (infrared light not detected) and continues through step 202 and then again branches back to step 152 continually cycling through this alternative sequence of steps (non reflective cycle) until a reflective surface is detected in step 158. For the initial first cycle beginning with step 152 through step 158 and continuing through step 170, the value of counter Cntr2 is reset. Counter Cntr2 is then incremented and, for each contiguous succeeding cycle, the value of counter Cntr2 is further incremented. Thus the value of counter Cntr2 indicates the number of infrared pulses not received by photodetector 94 for a given non reflective surface.

Thus as walker 5 alternately traverses from a reflective to non reflective floor surface 14 and vice versa, microcontroller 128 respectively alternates between the reflective cycle and non reflective cycle and vice versa. For each reflective or non reflective cycle in which both Cntr-1 and Cntr-2 registers are not equal to zero, microcontroller 128 determines if the ratio of the immediately previous value of counter Cntr1 (i.e. Cntr-1) to the immediately previous value of counter Cntr2 (i.e. Cntr-2) is between the predetermined limits N1 and N2. Only a narrow range of values of received and non received infrared pulses will cause their ratio to be between the predetermined limits of N1 and N2. Thus, it is therefore understood that in normal operation of walker 5, the ratio of the values of Cntr-1 to Cntr-2 will not be between the predetermined limits N1 and N2 and thus microcontroller 128 will continue within the respective reflective or non reflective cycles thereby not engaging brake assemblies 21a and 21b.

Now assume that walker 5 proceeds towards an open descending staircase 20 having an optically encoded strip 15 secured onto floor surface 14 in front of the staircase entrance. Upon walker 5 approaching open staircase 20 and forwardly passing over strip 15, front wheels 10 and 11 easily roll up over beveled edge 18 onto top 16 and down inside beveled edge 17 or strip 15. As walker 5 continues to be propelled towards open staircase 20, beveled edge 68 of brake assembly 21a eventually contacts outside beveled edge 18 of strip 15. Further forward motion of walker 5 towards open staircase 20 causes beveled edge 68 to smoothly ascend along outside beveled edge 18 thereby moving brake assembly 21a vertically with respect to support member 6. Brake assembly 21a is guided by pin 30 within slot 118 and freely moves in the vertical direction without impeding the forward motion of walker 5. As brake assembly 21a ascends edge 18, incident infrared light 90 is reflected off of the inclined edge 18 but not at the proper angle to activate photodetector Further forward motion of walker 5 over strip 15 eventually positions emitting diode 88 and photodetector 94 over reflective strip 3d. The incident infrared light 90 is now reflected off of strip 3d at the proper angle and received by photodiode 94. Thus microcontroller 128 begins a new reflective cycle (3d). Further forward motion of walker 5 eventually positions emitting diode 88 and photodetector 94 over non reflective strip 2d which then causes microcontroller 128 to begin a new non reflective cycle (2d). Non reflective cycle (2d) continues until the continued forward motion of walker 5 positions emitting diode 88 and photodetector 94 over non reflective strip 3c and which causes microcontroller 128 to begin another reflective cycle (3c). At this point register Cntr-1 has been updated with the value of counter Cntr1 obtained from strip 3d and register Cntr-2 has been updated with the value of counter Cntr2 obtained from strip 2d. Now at this point the values of register Cntr-1 and register Cntr-2 will be approximately the same because the widths of the reflective and non reflective bands are equal and therefore the ratio of the value of register Cntr-1 to the value of register Cntr-2 will be between N1 and N2.

Figure 7:
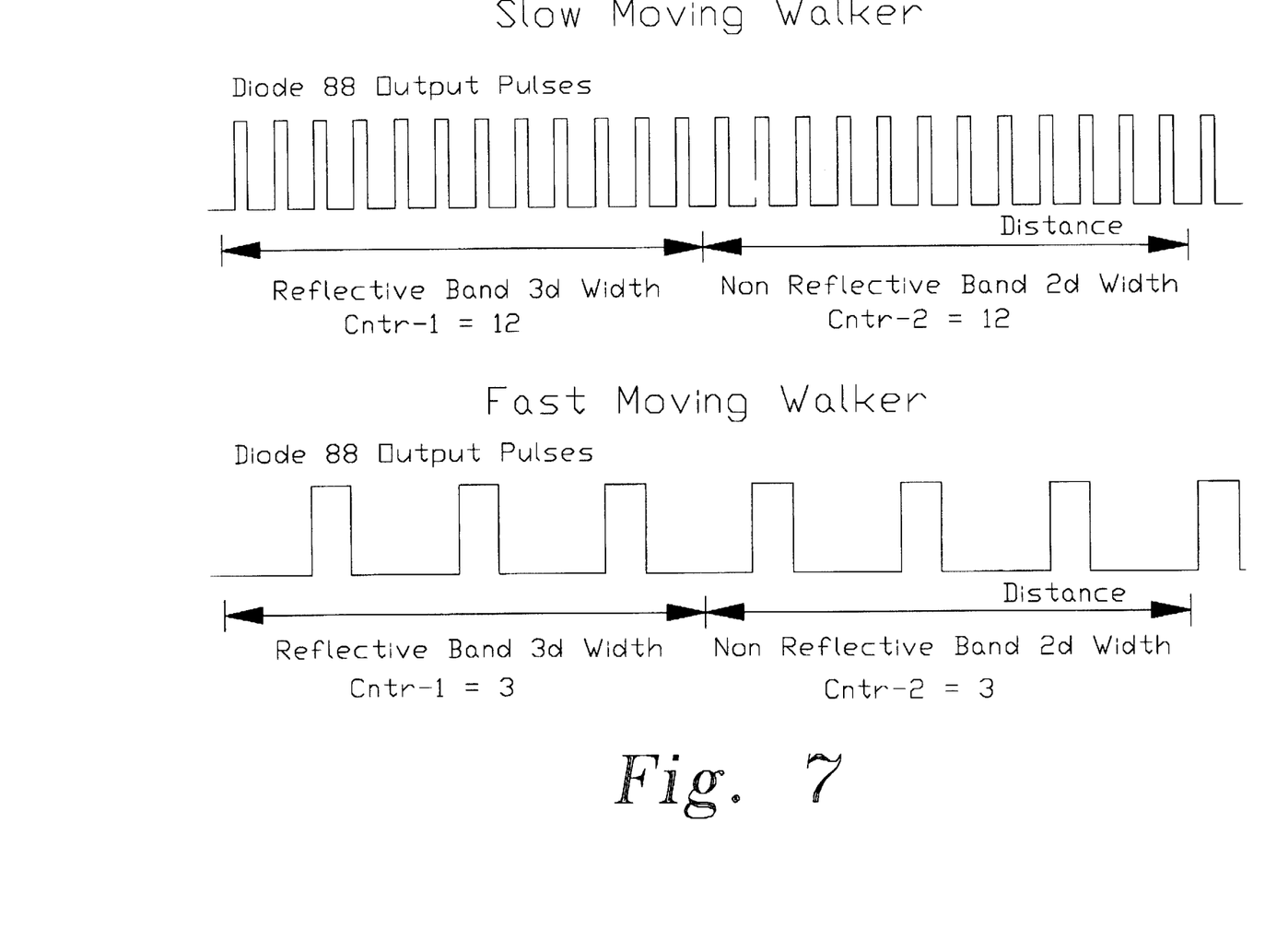
FIG. 7 illustrates the number of determined reflective and non reflective Cntr-1 and Cntr-2 register values for both a slow moving and fast moving preferred embodiment of the present invention traversing over an optically encoded strip.

Referring now additionally to FIG. 7, there is shown the reflective and non reflective register values respectively of Cntr-1 and Cntr-2 for both a slow and a fast moving walker 5 over strip 15. Although the absolute numbers for registers Cntr-1 and Cntr-2 for the slow moving walker 5 are greater than the absolute numbers of the same registers for the fast moving walker 5, the ratio of the value of register Cntr-1 to the value of register Cntr-2 remains the same for either a fast or slow moving walker 5 as the result of equal widths for the reflective and non reflective bands. Thus, the ratio, and therefore the determination of whether walker 5 has traversed strip 15, is independent of the speed of walker 5. Microcontroller 128, having now determined that the ratio is between N1 and N2, branches to step 204 thereby engaging brake assembly 21a.

Within step 204, microcontroller 128 sets pin PA0 high which enables alarm element 38 producing alarm sounds 42. Further, microcontroller 128 sets pin PA1 high which is then communicated via output connector 122 and line 123 to the corresponding input connector on brake assembly 21b. Additionally, microcontroller 128 sets pin PA4 high which turns on transistor 138. With transistor 138 on, current flows from Vbat through solenoid coil 109 through transistor 138 to ground.

In response to current flow, coil 109 produces a magnetic field 109a which pulls plunger 108 into the interior of solenoid 102 and against the force exerted by compression spring 112 thereby retracting nib 114 from hole 64. With nib 114 retracted, spring 60 of oppositely positioned pin 58 is unable to now counter the entire horizontal force component exerted by spring 48 through the triangularly shaped nib 62. Pin 58 is subsequently forced into hole 56 compressing spring 60 thereby disengaging nib 62 from hole 50. Piston 44 now comes under the direct force of compressed spring 48 and forceably moves outwardly from the bottom of housing 22.

As piston 44 moves in a vertically downward direction from housing 22, ball 78 and cup 76 are forced to retract into hole 72 of flange 66 against the force of spring 80. Ball 82 and the respective supporting cup also retracts into flange 66. With balls 78 and 82 fully retracted within flange 66, bottom surface 74 comes into frictional contact with floor surface 14. The force of compressed spring 48 acting through piston 44 and floor surface 14 now proceeds to displace housing 22 vertically until pin 30 contacts the top of slot 118. At this moment the force of compressed spring 48 acting now through piston 44, floor surface 14 and housing 22 proceeds to vertically displace in an upwards direction support member 6 from floor surface 14 thus substantially increasing the frictional contact between mobility apparatus 5 and floor surface 14 and lifting wheels 10 and 11 off of floor surface 14.

Brake assembly 21b within its corresponding reflective or reflective cycle will eventually check the value of the signal placed onto line 123 by brake assembly 21a via a corresponding step *202. In response to the signal placed onto line 123, a corresponding step *204 is executed engaging brake assembly 21b furthering the frictional contact between mobility apparatus 5 and floor surface 14. Additionally, brake assembly 21b within step *204 communicates to brake assembly 21a the fact that it has engaged by placing a logic 1 signal onto pin *PA1. With brake assembly 21a now engaged, microcontroller 128 proceeds to step 208.

Within step 208, microcontroller 128 continually checks the logic value of the signal placed on pin PA2 via line 125 by brake assembly 21b until brake assembly 21b has engaged. Microcontroller 128 then proceeds to step 210. Thus brake assembly 21a, having engaged, transmits a brake engage signal via line 123 to brake assembly 21b. In response to this signal, brake assembly 21b also engages and thereafter confirms this fact by placing a logical 1 signal onto line 125.

Within step 210, microcontroller 128 inputs the signal on pin PA3 to determine if reset switch 120 has been depressed. If the signal on pin PA3 is high (reset switch 120 depressed), microcontroller 128 proceeds to step 214. If the signal on pin PA3 is low (reset switch 120 not depressed), microcontroller 128 proceeds to step 212. Within step 212, microcontroller 128 further determines if a logic 0 signal has been received on pin PA2 via line 125 and input connector 124 originating from the corresponding output connector of brake assembly 21b. If the signal on pin PA2 is maintained at logic 1 indicating that brake assembly 21b has not been reset, microcontroller 128 proceeds back to step 210. If a logic 0 signal is present on pin PA2, microcontroller 128 proceeds to step 214. Thus microcontroller 128 proceeds to step 214 either if reset switch 120 is depressed or if a logic 0 signal is input from brake assembly 21b.

Within step 214, microcontroller 128 shuts off alarm element 38 by resetting pin PA0, resets pin PA1 which is then transmitted to the corresponding input connector of brake assembly 21b via connector 122 and line 123, and deactivates solenoid 102 by resetting pin PA4 which subsequently forces transistor 138 to turn off thereby preventing current flow through coil 109. As coil 109 becomes deenergized, diode 140 prevents large voltage spikes from occurring across the coil terminals. Brake assembly 21b, in response to a logic 0 signal placed onto line 123, now branches to step 214* and proceeds in a similar fashion as brake assembly 21a. Microcontroller 128 then proceeds to step 220.

Within step 220, microcontroller 128 enters a delay of preferably 60 seconds to enable the parent or other guardian sufficient time to manually disengage brake assembly 21a and any other similarly engaged brake assemblies. After the delay of step 220, microcontroller 128 then proceeds back to step 152 to again begin another new reflective or non reflective cycle.

To disengage brake assembly 21a, the parent or guardian forceably reinserts piston 44 back into housing 22 against the force of spring 48. With piston 44 fully inserted and seated within housing 22, pin 58 is forced outwardly from hole 56 by the force of spring 60 thereby extending nib 62 into hole 50. Similarly, with solenoid 102 deactivated and piston 44 fully inserted, plunger 108 is forced outwardly from solenoid 102 by spring 112 pushing against flange 110 and the body of solenoid 102 thereby extending nib 114 into hole 64. With nib 62 and nib 114 fully inserted into respective holes 50 and 64, piston 44 is now again latched within housing 22. Brake assembly 21b is similarly disengaged.

Figure 8:
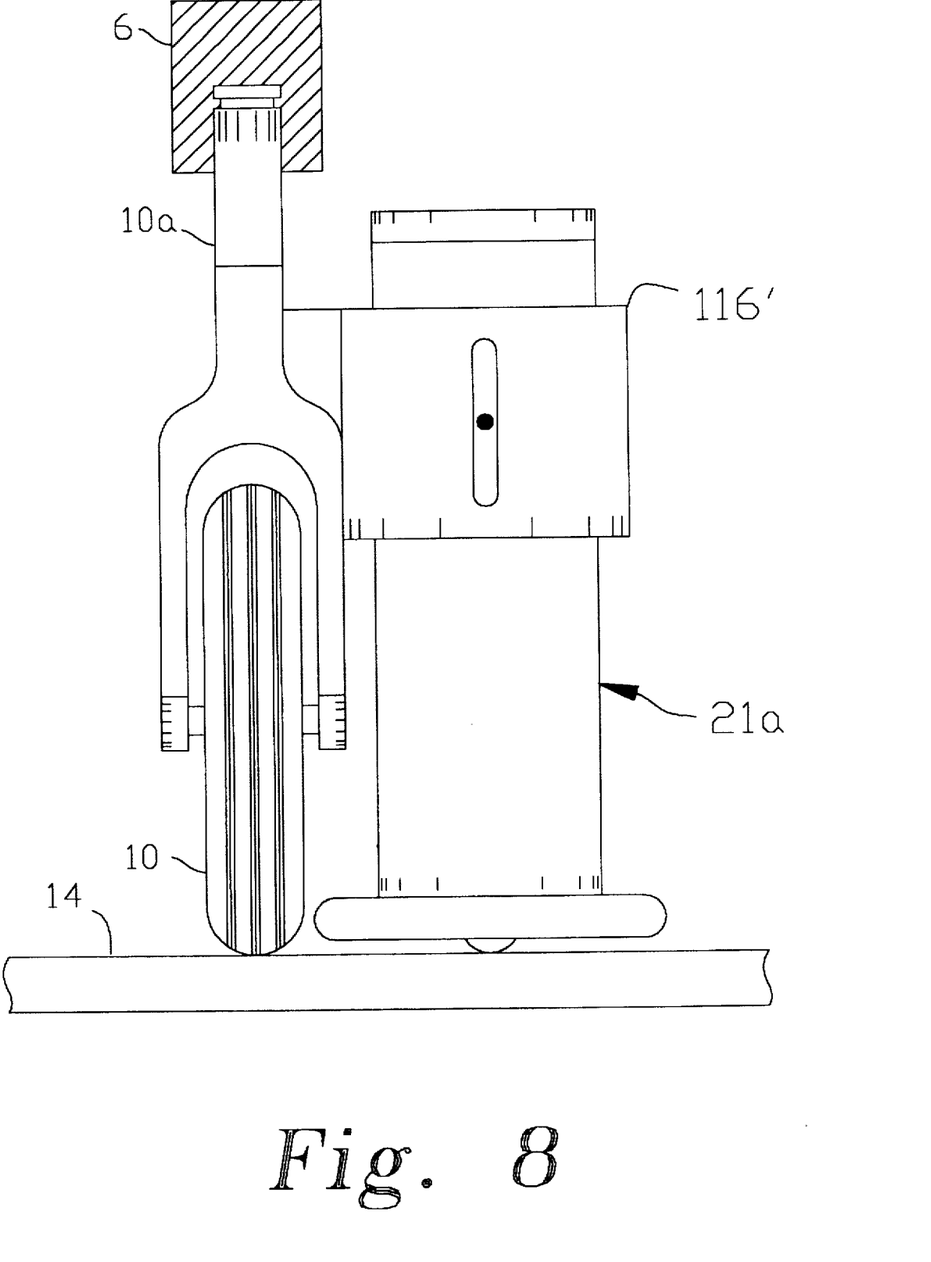
FIG. 8 illustrates an optically responsive wheel assembly of an embodiment or the present invention.

Referring now to FIG. 8, there is shown another embodiment of the present invention in which two or more wheel support assemblies 10a or 12a, could alternatively have formed cylindrically shaped brackets 116' for moveably attaching brake assemblies 21a and 21b. Bracket 116' serves the same function as bracket 116. Further, the hard wiring interconnection has been replaced with a conventional cooperating RF transcievers thus eliminating the possibility of fouling the wheel or wheel support assemblies with the interconnecting wires. It is thus understood that brake assemblies 21a and 21b could each be moveably attached to individual wheel support assemblies instead of support member 6 without altering the operation thereof.

While specific embodiments of the invention have been described in detail, it will be appreciated by those skilled in the art that various modifications and alternatives to those details could be developed in light of the overall teachings of the disclosure. For example, although the present invention describes a separate microcontroller for each brake assembly 21a and 21b, a single microcontroller could be used to control both the infrared emitting and detection for both brake assemblies and also the respective solenoids. Further, the hard wired communication link between brake assembly 21a and 21b when attached to support member 6 could also be replaced with conventional cooperating RF or ultrasonic transcievers. Additionally, the infrared emitting diode could be replaced with a conventional laser emitting diode. Accordingly, the particular arrangements disclosed are meant to be illustrative only and not limiting as to the scope of the invention which is to be given the full breadth of the appended claims and any and all equivalents thereof.

I claim:

1. A braking apparatus on a mobility apparatus, said mobility apparatus moveable along a surface, said apparatus comprising:

a housing attached to said mobility apparatus;

a piston springably biased within said housing;

an optically encoded reflective boundary positioned on said surface;

means for optically determining the presence of said boundary; and means for latching said piston within said housing, said latching means releasably responsive to said optical determining means, wherein unlatched said piston is forcibly extended outwardly from said housing engaging said surface this braking said mobility apparatus.

2. The apparatus of claim 1 wherein said latching means comprises:

a first pin having a triangularly shaped nib springably enclosed within said piston and engaging said housing; and a solenoid affixed to said housing and springably engaging said piston.

3. The apparatus of claim 1 wherein said reflective boundary comprises a strip having a pattern of alternating reflective and non-reflective bands.

* * * * *